United States Patent
Liebscher et al.

(10) Patent No.: US 10,894,301 B2
(45) Date of Patent: Jan. 19, 2021

(54) METHOD OF REMOVING A COATING OF ORGANIC MATERIAL ADHERING TO THE SURFACE OF TIN-PLATED SHEET STEEL

(71) Applicant: THYSSENKRUPP RASSELSTEIN GMBH, Andernach (DE)

(72) Inventors: Benjamin Liebscher, Welschneudorf (DE); Andreas Tschage, Montabaur (DE)

(73) Assignee: THYSSENKRUPP RASSELSTEIN GMBH, Andernach (DE)

( * ) Notice: Subject to any disclaimer, the term of this patent is extended or adjusted under 35 U.S.C. 154(b) by 839 days.

(21) Appl. No.: 15/398,201

(22) Filed: Jan. 4, 2017

(65) Prior Publication Data

US 2017/0189997 A1    Jul. 6, 2017

(30) Foreign Application Priority Data

Jan. 5, 2016  (DE) .......................... 10 2016 100 157

(51) Int. Cl.
| | |
|---|---|
| *B23K 26/354* | (2014.01) |
| *B23K 26/402* | (2014.01) |
| *B08B 7/00* | (2006.01) |
| *B23K 101/12* | (2006.01) |
| *B23K 103/08* | (2006.01) |

(Continued)

(52) U.S. Cl.
CPC .......... *B23K 26/354* (2015.10); *B08B 7/0035* (2013.01); *B23K 26/402* (2013.01); *C23G 5/00* (2013.01); *B08B 7/0042* (2013.01); *B23K 11/34* (2013.01); *B23K 2101/125* (2018.08);
(Continued)

(58) Field of Classification Search
CPC ..... B08B 7/0035; B08B 7/0042; B23K 11/34; B23K 26/354; B23K 26/402; B23K 2101/125; B23K 2101/34; B23K 2103/04; B23K 2103/08; B23K 2103/172;
(Continued)

(56) References Cited

U.S. PATENT DOCUMENTS

| | | | | |
|---|---|---|---|---|
| 9,496,128 | B1 * | 11/2016 | Bedell | ................ H01L 21/6835 |
| 2014/0218796 | A1 * | 8/2014 | Kozlov | .................... G02B 5/30 |
| | | | | 359/485.05 |
| 2017/0361403 | A1 * | 12/2017 | Gu | ............................ B08B 5/02 |

FOREIGN PATENT DOCUMENTS

| | | | |
|---|---|---|---|
| DE | 4202074 A1 * | 7/1993 | ............. B44D 3/166 |
| DE | 4202074 A1 | 7/1993 | |
| WO | WO-9802261 A1 * | 1/1998 | ......... B21D 51/2676 |

OTHER PUBLICATIONS

Result of examination report for German Patent Application No. 10 2016 100 157.0 filed Jan. 5, 2016, 1 page.

(Continued)

*Primary Examiner* — Dana Ross
*Assistant Examiner* — Michael S. Poetzinger
(74) *Attorney, Agent, or Firm* — Paul D. Bianco; Katharine Davis; Fleit Intellectual Property Law

(57) ABSTRACT

A method of removing a coating made of an organic material, in particular an organic lacquer or a polymer coating, which adheres to the surface of tin-plated sheet steel. In a first step, the tin layer of the tin-plated sheet steel is completely or incipiently melted by exposure to electromagnetic radiation with a predefined wavelength, to which the organic coating is at least primarily transparent, with the organic coating becoming detached from tin layer, and in a second step, the organic material of the coating which detached from the tin layer is removed.

20 Claims, 5 Drawing Sheets

(51) Int. Cl.
    *B44D 3/16*     (2006.01)
    *B23K 11/34*     (2006.01)
    *B23K 101/34*     (2006.01)
    *C23G 5/00*     (2006.01)

(52) U.S. Cl.
    CPC ...... *B23K 2101/34* (2018.08); *B23K 2103/08* (2018.08); *B44D 3/166* (2013.01)

(58) Field of Classification Search
    CPC .......... B23K 26/0626; B23K 26/351; B23K 26/362; B44D 3/166; C23G 5/00
    USPC .............. 219/121.6, 121.61, 121.65, 121.66, 219/121.68, 121.69, 121.84; 134/21, 5
    See application file for complete search history.

(56) References Cited

OTHER PUBLICATIONS

Laser applications, cleanLASER, 6 pages, printed Jan. 8, 2016 (with machine translation).

\* cited by examiner

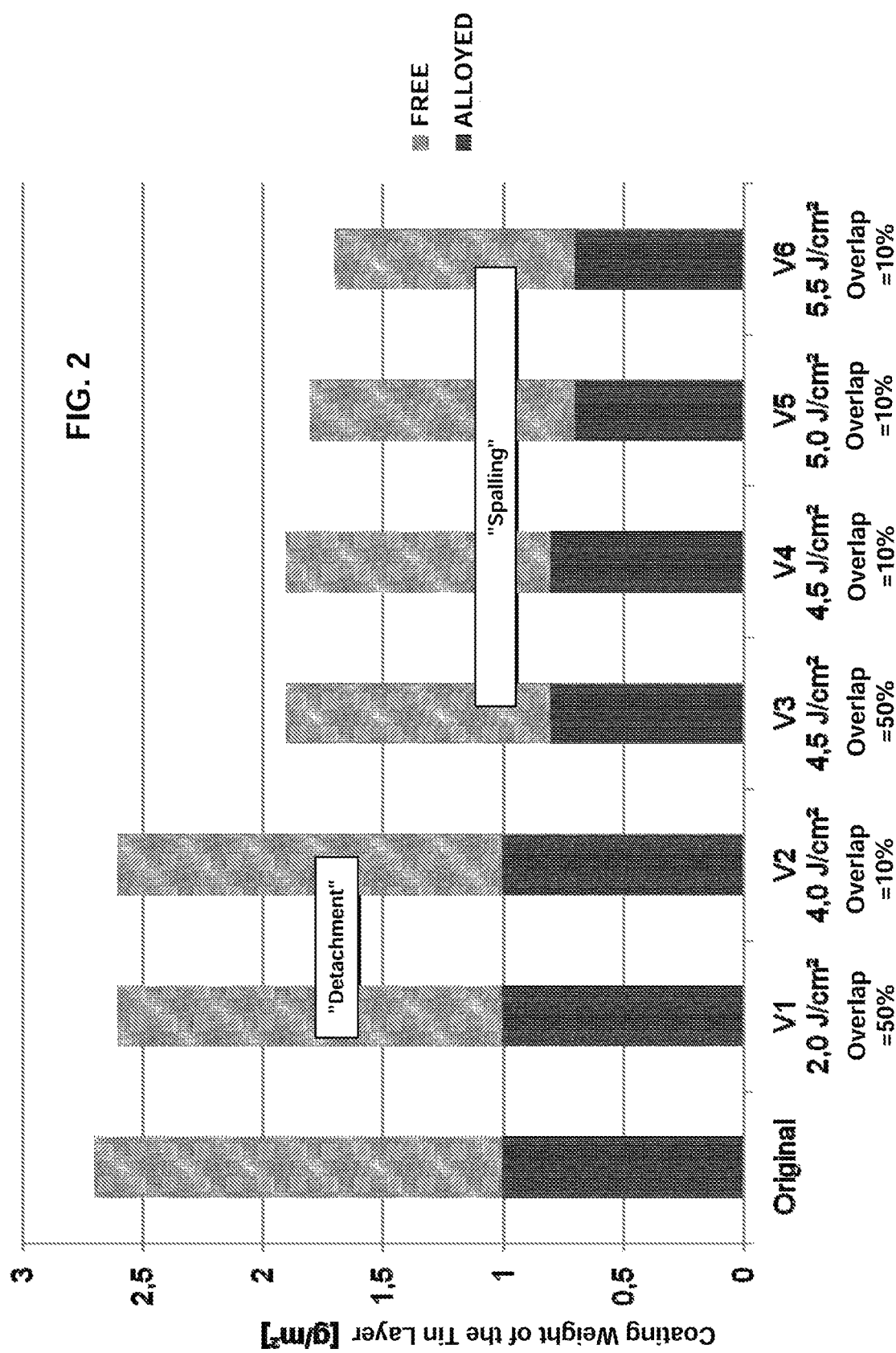

METHOD OF REMOVING A COATING OF ORGANIC MATERIAL ADHERING TO THE SURFACE OF TIN-PLATED SHEET STEEL

FIELD OF THE DISCLOSURE

The present disclosure relates to a method of removing a coating made of an organic material which adheres to the surface of tin-plated sheet steel.

BACKGROUND

In the production of can bodies for three-piece cans, for example, for food or beverage cans, tin-plated packaging steel (tinplate) is used. To improve the corrosion resistance of tinplate, it is known to coat the surface of the tinplate with an organic coating, for example, an organic lacquer or a polymer coating made of a polymer material, e.g., polyethylene terephthalate (PET), polypropylene (PP) or polyethylene (PE). Organic coatings of this type on the tinplate surface are necessary especially if the product in the can is acidic and therefore requires that the material the can is made of be resistant to acids. To meet this requirement, at least one side of the tinplate is covered with an organic coating, which, after the can has been produced, forms the inside surface of the can. In the state of the art, tinplate coated on both sides is known as well.

In the production of three-piece cans, to create the can body, a tinplate section coated with an organic coating is rolled to form a cylindrical jacket and welded along a longitudinal seam, for example, by means of electric resistance welding, in particular seam resistance welding or mash seam resistance welding. This requires that in the areas to be welded, the surface of the tinplate be free from organic coatings. To this end, it is known, for example, from the prior art that it must be ensured that during application of the lacquer to the tinplate, lacquer-free blocked-out areas are created, which, during the subsequent can production, form an area that can be welded. From the standpoint of production engineering, this is very complex and makes the lacquer application process more expensive.

When coating tinplate with a polymer material, for example, by applying a PET film laminate or by directly extruding a molten polymer material, such as PE or PP, onto it, the entire tinplate surface is coated with the polymer coating. To provide blockouts free from coating (free from polymer) in the welding areas of the tinplate sections, it is therefore necessary after application of the polymer coating to the tinplate surface, to remove the polymer coating in the welding areas. This can be accomplished, for example, with a laser, by means of which electromagnetic radiation is directed into the polymer coating, which radiation is absorbed by the polymer coating so as to burn it off. However, when burning off the polymer coating, burned polymer residues are left on the tinplate surface. During the subsequent welding of the welding areas, these residues have a detrimental effect and must therefore be chemically removed.

SUMMARY

Thus, there is a need for a method of simply and rapidly removing a coating made of an organic material, in particular an organic lacquer or a polymer coating, that adheres to the surface of tin-plated sheet steel (tinplate), by means of which method blocked-out areas can be produced on the surface of the tin-plated sheet steel, which blocked-out areas are free from organic material so as to allow the tin-plated sheet steel to be welded in these blocked-out areas. It should be possible to carry out this method without requiring cleaning with the use of chemicals.

Disclosed are embodiments that address these problems. Preferred embodiments of the method are also disclosed.

In an embodiment according to the method disclosed, electromagnetic radiation with a predefined wavelength, to which the organic coating is at least primarily transparent, is applied to predefined, in particular strip-shaped, areas on the surface of tinplated sheet steel which is coated with an organic coating. The energy density produced by the electromagnetic radiation in the predefined areas is selected to ensure that in the irradiated areas, the tin layer of the tin-plated sheet steel is completely or at least incipiently melted. Melting or incipient melting of the tin layer causes the organic coating to detach from the tin layer, which coating, in final step of the method according to the disclosure, can be easily removed from the tin layer which, after melting or incipiently melting, resolidified. The organic material of the coating which detached from the tin layer can be removed, for example, by suctioning or blowing. Thus, the use of a chemical, e.g., a chemical cleaning solution, is no longer required.

The energy density produced by the electromagnetic radiation inside the tin layer is preferably selected and adjusted in such a manner that the tin layer is at least superficially heated to temperatures above the melting point of the tin and, as a result, incipient melting of the surface takes place or the tin layer is melted throughout its entire thickness (down to the sheet steel).

In order to prevent the sheet steel from overheating and thus from subjecting it to thermal loads and to ensure that the incipiently or completely melted tin layer can rapidly resolidify, the electromagnetic radiation is preferably applied only for a predefined and limited irradiation time. After conclusion of the irradiation, the incipiently melted surface of the tin layer or the completely melted tin layer is able to rapidly resolidify, with the temperature of the still cold core of the sheet steel being rapidly and automatically equalized by heat conduction. Melting or incipient melting of the tin layer causes the organic coating adhering to the tin layer to detach from the surface of the tin and to remain separate from this surface even after resolidification of the incipiently or completely melted tin layer and can therefore be easily removed after solidification of the tin layer.

It has been found that by increasing the energy density produced by the electromagnetic radiation, it is even possible to spall the organic coating off from the tin layer of the tin-plated sheet steel. If the energy density produced by the electromagnetic radiation is high enough to superficially vaporize the tin of the tin layer, the organic layer will spontaneously spall off from the tin layer. It has been found that for such spalling to occur, the energy densities required at an irradiation time of 30 ns are higher than 4 $J/cm^2$.

In order to keep the thermal load on the sheet steel as low as possible and to avoid, for example, thermally induced deformations, energy densities at this high a level are preferably generated by a pulsed laser. To this end, it is possible to use, for example, pulsed lasers with a pulse frequency in a range from 1 to 100 kHz and a pulse length in a range from 1 to 1000 ns and preferably of 10 to 100 ns.

The wavelength of the electromagnetic radiation is preferably in the near-infrared (NIR) range and especially in a range from 0.8 to 2.5 μm. In this wavelength range, the organic materials conventionally used for the organic coating of tinplate, e.g., organic lacquers, such as vinyl, epoxy or epoxy phenolic resin lacquers, and the polymer materials PET, PP and PE are at least primarily transparent. The term 'transparent' is here defined to mean that for the wavelength of the electromagnetic radiation used, the coefficient of transmission of the organic material is higher than 75%. This ensures that the electromagnetic radiation at least for the most part passes through the organic coating free from absorption and acts mainly on the interface between the surface of the tin layer and the organic coating, thereby at least primarily incipiently melting the surface of the tin layer or melting it throughout its entire thickness. The radiation has no effect, or at least hardly any effect, on the organic coating. In particular, the organic material is not burned, and therefore no organic burn residues are formed.

BRIEF DESCRIPTION OF THE DRAWINGS

These and other advantages and characteristics of the disclosure follow from the embodiment example described in greater detail below with reference to the accompanying drawings. The drawings show:

FIG. 2: a diagram which illustrates the relationship between the remaining coating weight of the tin-plated sheet steel (tinplate) and the energy density produced in the method disclosed by the electromagnetic radiation inside the tin layer;

DETAILED DESCRIPTION

Figure 1B:
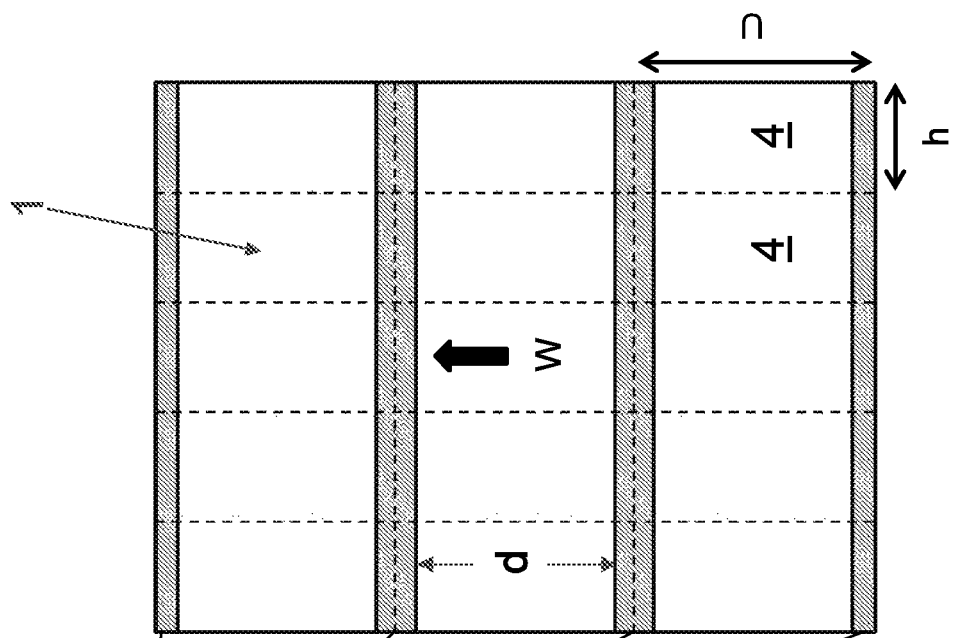
FIGS. 1A and 1B: schematic representations of the method disclosed, using as an example a tinplate panel with an organic coating which, by means of the method according to the disclosure, is removed in the predefined areas from the tinplate surface so as to create blocked-out areas.
Figure 1A:
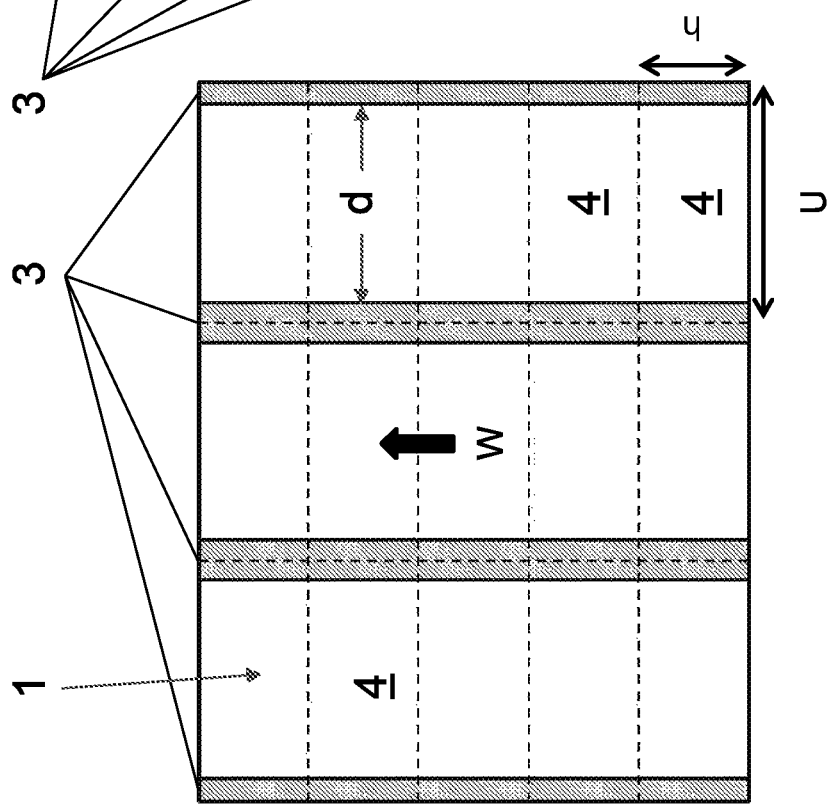
Figure 4:
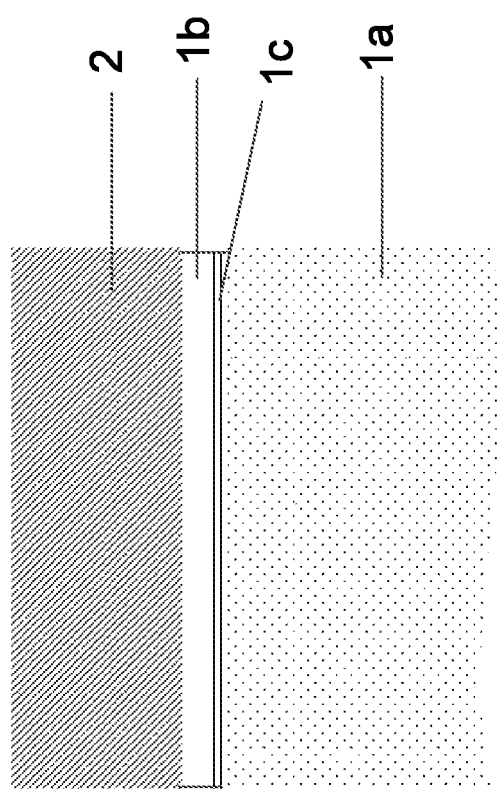
FIG. 4: a cross section through tinplate coated with an organic coating.

FIGS. 1A and 1B shows two variants of an embodiment for carrying out the method disclosed on a tinplate panel that is coated with an organic material. FIG. 4 shows a cross section through tinplate 1 (tin-plated sheet steel) which is coated on both sides with an organic coating 2. FIG. 4 reveals the layer structure which comprises the sheet steel 1a, the tin layer 1b which has been applied to both sides of the sheet steel and the organic coating 2 which adheres to the tin layer 1b. The tin layer 1b is preferably electrolytically applied to the sheet steel 1a. After the electrolytic application to the sheet steel 1a, the tin layer 1b was preferably at least partially melted so that an alloy layer 1c forms along the interface between the tin layer 1b and the sheet steel 1a, which alloy layer consists of iron atoms of the steel and tin atoms of the tin layer 1b. This alloy layer causes the tin layer 1b to adhere intimately to the sheet steel 1a and increases the corrosion resistance of the tinplate 1.

The coating 2 which adheres to the surface of the tin layer 1b is made of an organic material. This organic material can be, for example, an organic lacquer, e.g., a vinyl, epoxy or epoxy phenolic resin lacquer. The organic coating 2 can also be a polymer material, e.g., polyethylene terephthalate (PET), polypropylene (PP) or polyethylene (PE). The polymer coating can be applied, for example, by laminating a polymer film, in particular a PET, PP or PE film, or by directly extruding a molten polymer material, such as PET, PE or PP, onto the surface of the tin layer.

By means of the method disclosed, the organic coating 2 which adheres to the tin layer 1b of tinplate 1 is removed in predefined areas so as to create blocked-out areas on the surface of the coated tinplate, which blocked-out areas are free from organic material. During the subsequent production of three-piece cans, the created blocked-out areas can be welding areas, along which the tinplate can be welded to produce can bodies.

In the embodiment example shown in FIG. 1A, strip-shaped blocked-out areas 3 are provided, the longitudinal direction of which extends parallel to the rolling direction W of the sheet steel 1a and which, at right angles with respect to the rolling direction W, run at a predefined distance d relative to each another. After implementation of the method according to the disclosure, in the course of which blocked-out areas 3 are created on the tinplate surface, tinplate sections 4 are cut from the tinplate 1 shown in FIG. 1A. In FIG. 1A, the cuts to be made are identified by the broken lines. Each section 4 cut in this manner from the tinplate 1 can be used in the production of a can body for a three-piece can, with the section 4 being bent to form a cylindrical jacket and being welded together along its edges. The edges of each section 4, which are welded together during the production of the can body, have the blocked-out areas 3 which were produced by means of the method according to the disclosure and which are free from organic material, thereby making it possible to join the blocked-out areas 3 by welding them together. In FIG. 1A, the right section 4 in the lowermost row shows the height h and the circumference U of the can body which is produced from this section 4.

Using the method according to disclosure, it is similarly possible to create blocked-out areas 3 on the surface of the tinplate 1, which blocked-out areas run at right angles with respect to the rolling direction W of the sheet steel 1a and which, in the rolling direction W, are disposed at a predefined distance d from each other. This embodiment variant of the method according to the disclosure is illustrated in FIG. 1B. After the blocked-out areas 3 have been created, this embodiment variant again provides for sections 4 to be cut from the tinplate 1, which sections are joined along the edges comprising the blocked-out areas 3 by welding them together along a weld seam, thereby producing a can body.

To create the blocked-out areas 3 on the surface of the coated tinplate 1, first the coating 2 adhering to the surface of the tin layer 1b is detached from the tin layer 1b by directing electromagnetic radiation of high energy density, for example, laser radiation, onto the surface of the coated tinplate 1. The wavelength of the electromagnetic radiation, which is preferably monochromatic, is selected to ensure that the organic coating 2 is at least primarily transparent to radiation of the selected wavelength. This is to ensure that the electromagnetic radiation at least for the most part completely passes through the organic coating 2 without being absorbed and therefore reaches the area of the tin layer 1b. To ensure this, it suffices if the coefficient of transmission of the organic coating 2 for the selected wavelength of the electromagnetic radiation is at least 75%.

The energy density of the applied electromagnetic radiation and the length of irradiation time are selected to ensure that as a result of the application of the electromagnetic radiation, at least the surface of the tin layer 1b is heated to temperatures above the melting point of the tin (232° C.). This causes at least the surface of the tin layer 1b to be incipiently melted. At a sufficiently high depth of penetration of the electromagnetic radiation and a sufficiently long irradiation time, the tin layer 1b can also be heated throughout its entire thickness to temperatures above the melting point of the tin and can thus be completely melted.

To make it possible for the incipiently melted surface the tin layer 1b or the completely melted tin layer to resolidify, application of the electromagnetic radiation is stopped after a predefined length of irradiation time. A useful length of irradiation time is in a range of 1 nanosecond to 1000 nanoseconds (ns), preferably between 10 and 100 ns, and especially at a reference irradiation time of 30 ns. The applied energy density e of the radiation is preferably adjusted to the length of irradiation time t, with the relationship between the energy density e(t) and the length of irradiation time being expressed as follows:

$$e(t) = e_{Ref}\sqrt{\frac{t}{t_{Ref}}},$$

where
t [ns] is the length of irradiation time,
e(t) [J/cm$^2$] is the energy density at the desired length of irradiation time,
$t_{Ref}$=30 ns is the reference length of irradiation time and
$e_{Ref}$ is the reference energy density at the reference length of irradiation time
and $e_{Ref}$ is between 1 J/cm$^2$ and 8 J/cm$^2$.

As a result of incipiently or completely melting the tin layer 1b for a short time, the organic coating 2 detaches from the tin layer 1b, while at least the surface of this tin layer is molten. After solidification of the incipiently or completely melted tin layer 1b, the organic coating 2 adheres, if at all, only weakly to the surface of the tin layer 1b. Because of the no longer present, or at best very weak, adhesion, the coating 2 that detached from the tin layer 1b can subsequently be very easily removed, for example, by blowing with a stream of gas or by suction in vacuo or even by mechanical action.

To obtain smooth edges along the blocked-out areas 3, it is recommended that the remaining coating 2 made of the organic material, which still adheres to the tin layer 1b, be cut off along the edges of the blocked-out areas 3. This can be done, for example, by means of laser cutting, using a laser cutter with a wavelength that is not absorbed by the organic coating 2.

It has been found that the edges of the blocked-out areas 3 can also be very efficiently cut off by means of the electromagnetic radiation that is used in the method according to the disclosure for incipiently or completely melting the tin layer 1b. This requires an energy density of more than 4 J/cm$^2$. If electromagnetic radiation with an energy density of more than 4 J/cm$^2$ is applied, the tin layer 1b is not merely heated to temperatures above the melting point of the tin, but instead the tin on the surface of the tin layer 1b is vaporized. Because of the vaporization of the tin on the surface of the tin layer, the coating 2 adhering to the tin layer 1b is spalled off from the tin layer 1b and thereby automatically detaches, without requiring an active step to remove the organic material of the coating 2. Because of the spontaneous spalling of the organic coating, the spalled-off area of the coating 2 detaches from the other areas of the coating 2 that are to remain on the surface of the tinplate. When this procedure is used, it is not necessary to cut off the edges of the blocked-out areas 3 from the areas of the coating 2 which still remain on the surface of the tinplate.

By means of comparative experiments, it was possible to demonstrate that at an irradiation time of 30 ns in the range of an energy density from 1.0 to 4.0 J/cm$^2$, the tin layer 1b is merely incipiently or completely melted, whereas at energy densities higher than 4 J/cm$^2$, the organic coating is spontaneously spalled off from the tin layer 1b because at these high energy densities, the tin on the surface of the tin layer 1b vaporizes. This is illustrated in the diagram of FIG. 2. In this diagram, the coating weights of the tin layer 1b, which after implementation of the method according to the disclosure remains on the sheet steel 1a as a result of the application of an electromagnetic radiation at various energy densities, are plotted as a function of the applied energy density, with the coating weight of the remaining tin layer being plotted on the ordinate and the applied energy densities on the abscissa of the diagram. It can be seen that when electromagnetic radiation with energy densities from 4.5 J/cm$^2$ to 5.5 J/cm$^2$ is applied, the coating weight of the remaining tin layer is by approximately 20% lower than the coating weight of the tin layer at an energy density in the range from 2 to 4.0 J/cm$^2$. This indicates that upon application of the high energy densities, the coating weight of the remaining tin layer 1b is reduced, which leads to the conclusion that part of the tin layer 1b on the surface vaporizes. In the diagram of FIG. 2, the alloyed portion of the coating weight, which in the region of the alloy layer has been alloyed with the iron of the steel, is plotted as well.

During application of an electromagnetic radiation for the purpose of incipiently or completely melting the tin layer 1b, the use of excessively high energy densities should be avoided so as to ensure that a sufficiently large quantity of free tin remains in the tin layer 1b. At a coating weight of at least 0.5 g/m$^2$ of free tin, the tin-plated sheet steel 1 remains readily weldable. The energy density of the electromagnetic radiation is therefore preferably limited to a maximum of 8 J/cm$^2$.

Examples of implementations of the method according to the disclosure will be described below:

Example 1 (Comparative Example)

On tinplate 1 which is coated with a PET film, blocked-out areas 3 were created in the coating 2 by exposing these areas to radiation by means of a CO$_2$ laser with a wavelength of 9.3 µm. The material of the coating 2 (PET) is for the most part opaque to the wavelength (9.3 µm) of the laser used and therefore absorbs the laser radiation applied. The laser radiation applied was pulsed with a pulse frequency of 20 kHz and a duty cycle of 20% at a maximum laser power of 1 kW. Application of the laser radiation causes the PET film that is laminated onto the tinplate 1 to burn. It was not possible to find laser settings at which the PET film burns and can be removed from the surface of the tinplate without leaving a residue. A thin residual PET film remains at least in the middle of the area that was exposed to laser radiation. Even a repeat application of radiation was unable to remove these film residues. An increase in the laser power also did not lead to a residueless removal, but instead, especially if the laser power was very high, merely to undesirable thermally induced stresses in the tinplate 1.

Example 2 (Example According to the Disclosure)

Tinplate 1 identical to that of Example 1 was exposed to radiation by means of a pulsed solid state laser, the wavelength of which was 1.03 µm, rather than to radiation by means of a CO$_2$ laser. The organic material (PET) of the coating 2 is transparent to this wavelength, so that the laser radiation at least primarily acts on the interface between the tin layer 1b and the PET film laminated thereon. Short pulse durations from 10 to 100 ns, in particular of 30 ns, were used so as to be able to achieve the highest possible energy input into the tin layer 1b at a low thermal load on the tinplate 1. The pulse frequency of the pulsed laser radiation used was in a range of 1 to 100 kHz, in particular a pulse frequency of 10 kHz was used. The pulse overlap of the laser pulses was varied within a range from 10% to 50%, at a line overlap of 10%. By varying the applied energy density and the pulse overlap it was possible to demonstrate that at energy densities higher than 4 J/cm², the organic coating 2 spontaneously spalls off from the tin layer 1b, with the surface of the layer 1b being vaporized.

Using the pulsed laser radiation with a wavelength of 1.03 μm, strip-shaped blocked-out areas without residues were created in the coating 2. By exposing the coated tinplate 1 in the blocked-out areas to this laser radiation, the coating 2 first detached from the tin layer 1b, and it was subsequently possible to remove it, for example, by blowing or suction.

Example 3 (Example According to the Disclosure)

Figure 3A:
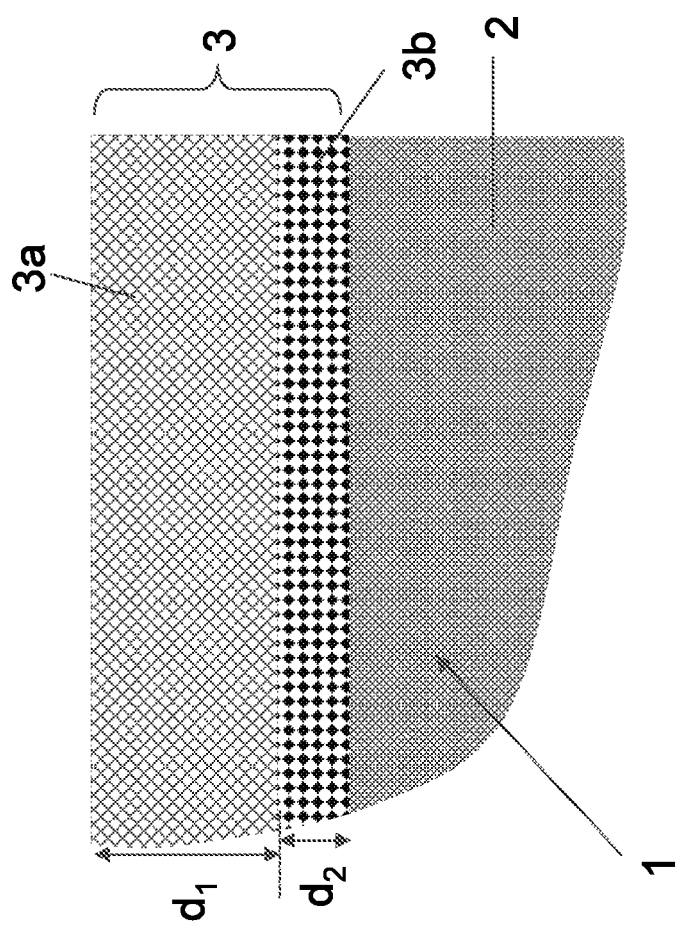
FIGS. 3A and 3B: a detail view of a blocked-out area in the organic coating of a tinplate section, said blocked-out area in FIG. 3A being located along the edge and in FIG. 3B in the middle of the tinplate section.

To detach a strip-shaped blocked-out area in the coating 2 of tinplate 1, in a first area 3a, an approximately 4 mm wide strip along the edge of a tinplate section was exposed to radiation by the laser of Example 1 at an energy density of 3 J/cm², as shown in FIG. 3A. As a result of the application of the laser radiation at an energy density of approximately 3 J/cm², the surface of the tin layer 1b was incipiently melted, which caused the coating 2 in this area to detach from the incipiently melted tin layer. In an adjacent strip-shaped second area 3b facing toward the inside of the section, the tinplate 1 was exposed to laser radiation at a higher energy density of 5.0 J/cm². In this area, the high energy density caused the surface of the tin of the tin layer 1b to vaporize and led to a spontaneous spalling of the coating 2. This had the effect that the spalled-off area of the coating 2 in the laser-exposed second area 3b was at the same time cut off the coating 2 which in the area of the tinplate that was not exposed to radiation still remained on the surface of the tin layer 1b. This procedure led to a clean separation of the remaining coating 2 from the separated coating and thus produced a clean edge along the blocked-out area 3. It was subsequently possible to easily blow off the coating, which had been separated in the laser-exposed areas 3a and 3b from the tinplate, by means of a stream of air or to suction it off with a suctioning device.

Figure 3B:
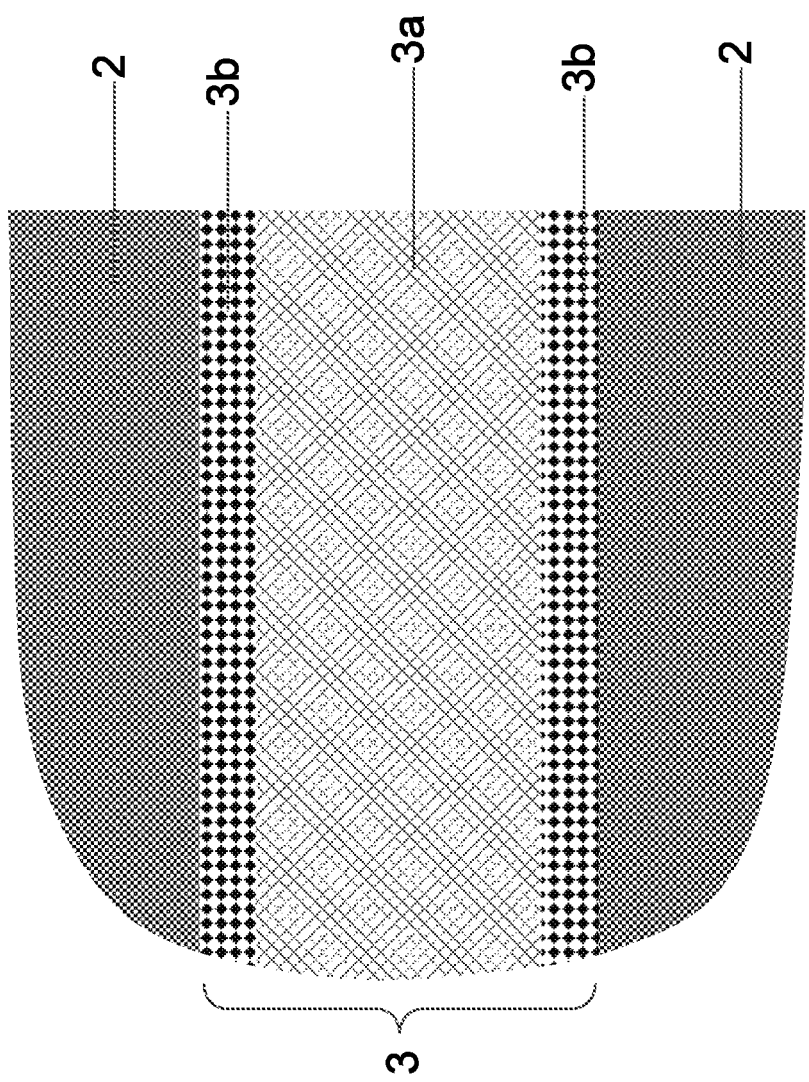

Similarly, a strip-shaped blocked-out area 3 of the coating 2 of the tinplate 1 can also be created in the middle of a tinplate section or panel, as shown in FIG. 3B, in which case here, in order to separate the coating 2 remaining on the tin surface, an outer area 3b of the blocked-out area 3 was exposed to radiation at a higher energy density of >4 J/cm² so as to spontaneously spall off the coating 2 and the inner area 3a to radiation at a lower energy density of <4 J/cm².

Example 4

After implementation of the method according to the disclosure, in the course of which strip-shaped blocked out areas 3 had been created along the edges of the tinplate sections, the tinplate samples 1 treated as described in Examples 2 and 3 were welded together in the areas of the blocked-out areas 3 by means of seam resistance welding. Welding together the tinplate sections along a weld seam in the area of the blockouts at the welding speeds conventionally used in the production of 3-piece cans presented no problems.

What is claimed is:

1. A method of removing a coating of organic material adhering to a surface of tin-plated sheet steel, the method comprising:
exposing a tin layer of the tin-plated sheet steel underlying the coating of organic material to electromagnetic radiation thereby melting the tin layer such that the coating of organic material detaches from a surface of the tin layer, the electromagnetic radiation having a wavelength in a range between 0.8 to 2.5 μm and passing through the coating of organic material without absorption to the tin layer; and
removing the coating of organic material from the tin-plated sheet steel after detaching from the surface of the tin layer.

2. The method in accordance with claim 1, wherein the coating of organic material has a coefficient of transmission for the wavelength of the electromagnetic energy higher than 75%.

3. The method in accordance with claim 1, wherein the organic material of the coating of organic material is an organic lacquer or a polymer material.

4. The method in accordance with claim 3, wherein the organic lacquer is a vinyl, epoxy, or epoxy phenolic organic lacquer and the polymer material is polyethylene terephthalate (PET), polypropylene (PP), or polyethylene (PE).

5. The method in accordance with claim 1, wherein exposing the tin layer to electromagnetic radiation includes heating at least the surface of the tin layer to a temperature above a melting point of tin, thereby incipiently melting the tin layer.

6. The method in accordance with claim 1, wherein exposing the tin layer to electromagnetic radiation includes heating the tin layer to a temperature above a melting point of tin such that the tin layer is completely melted throughout an entire thickness.

7. The method in accordance with claim 1, wherein removing the coating of organic material from the tin-plated sheet steel after detaching from the surface of the tin layer is carried out with suction or blowing.

8. The method in accordance with claim 1, wherein exposing the tin layer to electromagnetic radiation is carried out for a pre-defined period of time.

9. The method in accordance with claim 8, further comprising, after exposing the tin layer to the electromagnetic radiation for the pre-defined period of time, cooling the melted tin layer below a melting point of tin, thereby re-solidifying the melted tin layer.

10. The method in accordance with claim 1, further comprising selecting an energy density for the electromagnetic radiation capable of vaporizing tin at the surface of the tin layer and spalling the coating of organic material from the surface of the tin layer.

11. The method in accordance with claim 10, wherein the energy density for the electromagnetic radiation is higher than 4 J/cm².

12. The method in accordance with claim 1, wherein exposing the tin layer to electromagnetic radiation includes using pulsed electromagnetic radiation, the pulsed electromagnetic radiation having a pulse frequency in a range of 1 to 100 kHz and a pulse length in a range of 1 to 1000 ns.

13. The method in accordance with claim 1, wherein the tin-plated sheet steel is formed by a plurality of sections or panels of tinplate.

14. The method in accordance with claim 13, wherein removing the coating of organic material includes removing the coating in strips, thereby forming coating-free strips in the plurality of sections or panels of tinplate.

15. The method in accordance with claim 14, further comprising welding the coating-free strips together with a welded seam.

16. The method in accordance with claim 14, wherein width of the coating-free strips is in a range of 1 to 8 mm.

17. A method of removing a coating of organic material adhering to a surface of tin-plated sheet steel, the method comprising:
   exposing a first area of a tin layer of the tin-plated sheet steel underlying the coating of organic material to electromagnetic radiation of a first energy density, thereby melting the first area of the tin layer such that the coating of organic material detaches from a surface of the first area of the tin layer;
   removing the coating of organic material from the first area of the tin layer after detaching from the surface of the first area of the tin layer;
   exposing a second area of the tin layer of the tin-plated sheet steel underlying the coating of organic material to electromagnetic radiation of a second energy density different from the first energy density, thereby melting the second area of the tin layer such that the coating of organic material detaches from a surface of the second area of the tin layer; and
   removing the coating of organic material from the second area of the tin layer after detaching from the surface of the second area of the tin layer.

18. The method according to claim 17, wherein the second energy density of electromagnetic radiation is higher than the first energy density of electromagnetic radiation.

19. The method in accordance with claim 18, wherein the second energy density of electromagnetic radiation is capable of vaporizing tin at the surface of the second area of the tin layer and spalling the coating of organic material from the surface of the second area of the tin layer.

20. The method in accordance with claim 19, wherein the second energy density for the electromagnetic radiation is higher than 4 J/cm$^2$.

* * * * *